Oct. 2, 1945.  N. S. REYNOLDS  2,385,941
SEAL
Filed April 3, 1943

INVENTOR
N.S. REYNOLDS
BY P. H. Lamphere
ATTORNEY

Patented Oct. 2, 1945

2,385,941

UNITED STATES PATENT OFFICE 2,385,941

SEAL

Noel S. Reynolds, St. Louis, Mo.

Application April 3, 1943, Serial No. 481,724

12 Claims. (Cl. 288—3)

My invention relates to seals and more particularly to an improvement in the type of seal disclosed in my copending application Serial No. 433,891, filed March 9, 1942, for Seal.

Among the objects of my invention is that to provide improved means for attaching a thrust ring to a diaphragm of a seal which is provided with a sealing lip adjacent the thrust ring.

Figure 1:
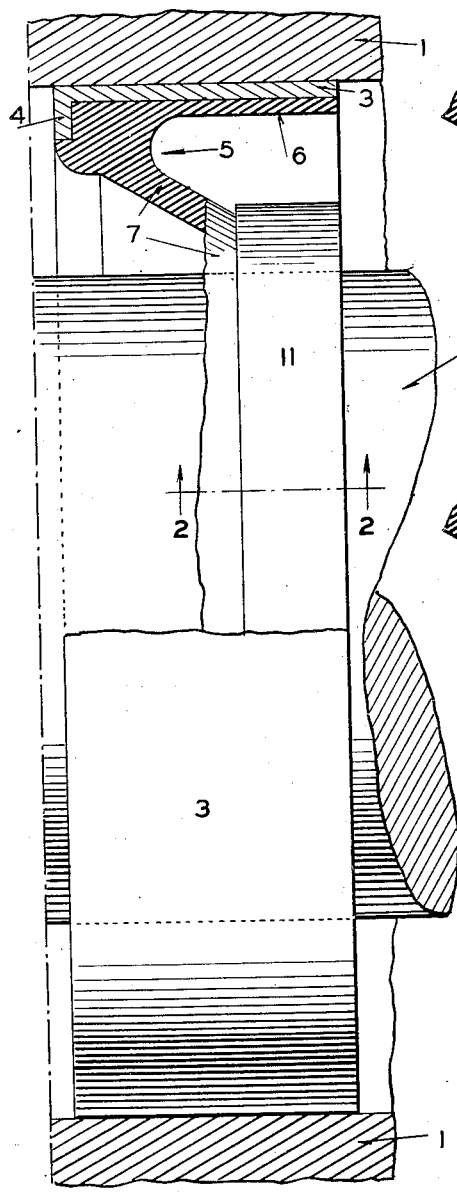
Figure 2:
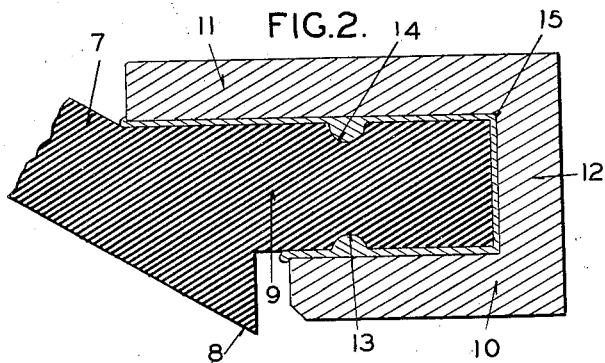
Figure 3:
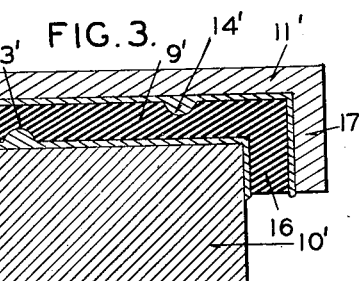
Figure 4:
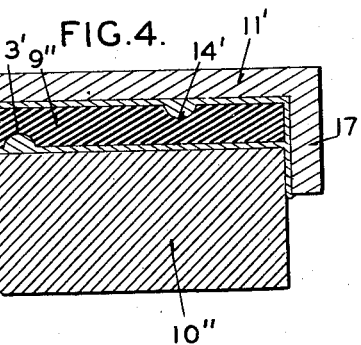

Other objects of my invention will become apparent from the following description taken in connection with the accompanying drawing in which Figure 1 is a view, partly in section, showing a seal embodying my invention; Figure 2 is a sectional view taken on the line 2—2 of Figure 1 showing details of the thrust ring and means for attachment; Figure 3 is a sectional view similar to Figure 2 but showing a modified construction in which the thrust ring and overlying ring are separate elements; and Figure 4 is a sectional view of still another modified construction.

Referring first to Figures 1 and 2, my improved seal may be used between any two relatively rotatable members but is shown, by way of example, as being employed as a sealing means between a fixed member 1 and a rotating shaft 2, said shaft having bearing support on said fixed member which may be a surrounding housing of a wall through which the shaft extends. The seal has a cylindrical shell or housing member 3 of suitable material, such as metal, and at one end is provided with an inturned flange 4. The member 3 has a tight fit with fixed member 1. Carried within the cylindrical member is a diaphragm member 5 made of a flexible material such, for example, as rubber or synthetic rubber or rawhide. The outer portion 6 of this member is sealed to the inner surface of the cylindrical member 3 and when rubber is used, as shown, it is directly bonded to the member. The outer portion has an integral web 7 extending to a point adjacent the shaft where it is provided with a sealing lip 8 in the form of an annular ridge of V-shaped cross-section in order to produce a flexible and yieldable edge for engaging the shaft surface. Thus by means of this annular ridge there is provided an annular sealing lip which can have pressure engagement with the surface of the shaft to make a seal therewith and prevent grease, oil, and so forth, passing the seal from the front to the left. The sealing action is brought about by having the inner diameter of the ridge slightly less than the diameter of the shaft with which the seal is to cooperate. Therefore, when the seal is placed on the shaft, a portion of the ridge will be flexed, causing the ridge to have pressure engagement with the shaft surface.

In addition to lip 8, the inner end of web 7 has an integral annular extension 9 which extends in a direction to be parallel with the shaft axis when the seal is in position. On this extension are positioned two concentric rings 10 and 11 integrally connected by a web 12. The inner ring 10 acts as a thrust ring and its inner diameter is such as to just fit the shaft so that the shaft can turn freely therein. The purpose of this ring is to take the thrust of the shaft caused by eccentric movement of the shaft. Thus there will be no thrust transmitted to the sealing lip ridge 8 and wear thereon will be reduced to a minimum. Any wear that takes place will be uniform. The V-edge of the lip will always move with ring 10 when said ring is moved by eccentric movement of the shaft. The pressure engagement of the lip on the shaft will also be maintained constant and can be regulated by the inner diameter of the ridge and the flexibility of the material. The outer ring 11 not only overlies the inner ring but also that portion of the web radially opposite the lip. This gives a backing to the lip and also prevents the web from pulling the lip away from the shaft if the shaft should have excessive eccentric movement with respect to the support 1 due to wear of the shaft bearing.

The seal just described is the same as that shown and claimed in my co-pending application referred to above. Some difficulty has been experienced in manufacturing the seal and particularly in securing rings 10 and 11 to extension 9. Adhesives and cements have been used but they have not been found as durable as desired. I have, however, found that a very satisfactory attachment of the rings can be made by employing a thermo-setting bonding material and so associating it with the rings and extension that a "locking" action is obtained. The thermo-setting bonding material is preferably of the plastic type having a phenol formaldehyde base, although others may be suitable, as, for example, a synthetic rubber which has a low absorption characteristic. This bonding material will bond to the rings which are of a rigid stable bearing material, such as steel, bronze, or moulded plastic, and produce a union as strong or stronger than the bonding material itself. Although bonding to the rubber or synthetic rubber of the diaphragm, the flexing of the rubber may cause a breaking of the bonding material. In order to insure, regardless of a strong union with the diaphragm, that the rings will be durably attached to the extension, there is provided additional "locking" means. As shown in Figure 2, this "locking" is accomplished by providing the inner and outer surfaces with recesses 13 and 14.

In attaching the rings the thermo-setting bonding material 15 is placed on both sides of the extension 9 and the end thereof. The material comes in a liquid state and thus it can be easily applied as by dipping. The material fills the recesses 13 and 14 which may be circular or elongated or in the form of an annular groove, the latter being preferable. The rings are now slipped on the extension to where the end abuts web 12. Heat is now applied to the assembly for a sufficient time to set the bonding material. The time factor will vary depending upon the materials used. The result is a durable attachment of the rings. The bonding material will not break away from the rings and the set bonding material filling the recesses will lock the rings in position and prevent them from sliding off the extension even if the bonding material should become broken away from the rubber by a severe stretching or flexing.

In Figure 3 I have shown a modified construction in which the thrust ring and backing ring are separate elements and indicated by the numerals 10' and 11', respectively. The extension 9' on web 7 is of slightly different form, being somewhat thinner to accommodate a thicker thrust ring which may be made from carbon or a moulded plastic material having good bearing characteristics. The outer end of the extension has an inturned flange 16 which will engage the end of thrust ring 10' and prevent it from sliding off the extension. The inner ring 11' also has an inturned flange 17 to support the rubber flange. The thermo-setting bonding material 15 is employed to attach the rings and the extension 9' has recesses 13' and 14' to lock the rings. After applying the liquid bonding material the inner ring is first assembled back of the extension flange 16 and then ring 11' slipped into place. Heating then causes a setting of the bonding material.

In Figure 4 the construction is the same as in Figure 3 but flange 16 on the extension has been eliminated and the thrust ring 10'' made of greater length. The extension is indicated by the numeral 9''. The remaining parts bear the same reference characters as those of Figure 3. The flange 17 on the backing ring 11' holds the thrust ring 10'' in proper position. It is to be noted that in the structures of both Figures 3 and 4, the thrust ring abuts the main body of web 17. In order that lip 8 can have room to flex, the inner ends of these thrust rings are beveled as indicated at 18.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a seal construction having a flexible web of yieldable material provided with an integral sealing lip and an integral portion provided with a cylindrical surface adjacent the lip, a relatively rigid thrust member associated with the cylindrical surface and the lip and of such diameter that the lip extends beyond its thrust surface, and means for attaching the thrust member to the extension and comprising a recess in the cylindrical surface and thermo-setting bonding material filling the recess and being bonded to the surface thereof and the surface of the thrust member.

2. In a seal construction having a flexible web of yieldable material provided with an integral sealing lip and an integral extension adjacent the lip, a relatively rigid thrust member associated with the lip, means for attaching the thrust member to the extension and comprising a recess in the extension and thermo-setting bonding material filling the recess and being bonded to the surface thereof and the surface of the thrust member, and means carried by the extension and overlying a portion of the end of the thrust member remote from the lip.

3. In a seal construction for association with a shaft, an annular diaphragm of rubber having an integral shaft engaging lip and an integral axial projecting cylindrical extension adjacent the lip on the side thereof opposite the diaphragm and adapted to be spaced from the shaft when the lip is engaged therewith, a thrust ring of carbonaceous material for the lip positioned beneath the extension and closely adjacent the lip, said lip projecting inwardly beyond the thrust surface of the ring and the surface of the extension adjacent the lip being provided with a recess and thermo-setting bonding material bonded to the adjacent surfaces of the ring and the extension and filling the recess.

4. In a seal construction for association with a shaft, an annular diaphragm having a shaft engaging lip and an integral axial extension adjacent the lip spaced from the shaft when the lip is engaged therewith, an inwardly extending flange on the end of the extension, a thrust ring positioned beneath the extension and of such width as to fill the space between the lip and the flange, and a rigid backing ring overlying the extension and confining said extension between it and the thrust ring.

5. In a seal construction for association with a shaft, an annular diaphragm having an integral shaft engaging lip and an integral axial extension adjacent the lip spaced from the shaft when the lip is engaged therewith, an inwardly extending flange on the end of the extension, a thrust ring positioned beneath the extension and of such width as to fill the space between the lip and the flange, and a rigid backing ring overlying the extension and the lip and confining said extension between it and the thrust ring, said backing ring having a flange overlying the flange of the extension.

6. In a seal construction for association with a shaft, an annular diaphragm of flexible and yieldable material having a shaft engaging lip and an axial extension adjacent the lip which is spaced from the shaft when the lip is engaged therewith, said extension being provided with recesses on its interior and exterior surfaces, an integral thrust ring and backing ring for positioning on said extension, said thrust ring being positioned adjacent the inner surface of the extension and closely adjacent the lip and the backing ring being positioned on the outer surface of the extension, and thermo-setting bonding material filling the recesses and being bonded to the adjacent surfaces of the rings and the extension.

7. In a seal construction for association with a shaft, an annular diaphragm of flexible and yieldable material having a shaft engaging lip and an axial extension adjacent the lip which is spaced from the shaft when the lip is engaged therewith, said extension being provided with recesses on its interior and exterior surfaces, a thrust ring for the lip positioned on the inner side of the extension, a backing ring positioned on the outer side of the extension and overlying the lip, thermo-setting bonding material bonded to the thrust ring and the adjacent surface of the extension and filling the recess thereof, and other thermo-setting bonding material bonded to the backing ring and the adjacent surface of the extension and filling the recess thereof.

8. In a seal construction for association with a shaft, an annular diaphragm of flexible and yieldable material having a shaft engaging lip and an axial extension adjacent the lip which is spaced from the shaft when the lip is engaged therewith, said extension being provided with recesses on its interior and exterior surfaces, a thrust ring for the lip positioned on the inner side of the extension, a backing ring positioned on the outer side of the extension and overlying the lip, thermo-setting bonding material bonded to the thrust ring and the adjacent surface of the extension and filling the recess thereof, other thermo-setting bonding material bonded to the backing ring and the adjacent surface of the extension and filling the recess thereof, and means for preventing axial movement of the thrust ring with respect to the backing ring.

9. In a seal construction for association with a shaft, an annular diaphragm of flexible and yieldable material having a shaft engaging lip and an axial extension adjacent the lip which is spaced from the shaft when the lip is engaged therewith, said extension being provided with recesses on its interior and exterior surfaces, a thrust ring for the lip positioned on the inner side of the extension, a backing ring positioned on the outer side of the extension and having a flange extending inwardly to a point beyond the extension, thermo-setting bonding material bonded to the thrust ring and the adjacent surface of the extension and filling the recess thereof, other thermo-setting bonding material bonded to the backing ring and the adjacent surface of the extension and filling the recess thereof, and means for preventing axial movement of the thrust ring with respect to the backing ring.

10. In a seal construction having a flexible web of yieldable material provided with an integral sealing lip and an integral extension adjacent the lip on the side thereof opposite the web, a relatively rigid thrust ring associated with the lip and underlying the extension, the inner diameter of the thrust ring being greater than that of the lip, and means for locking the ring to the extension to prevent relative axial movement, said means comprising a recess in the extension and material filling the recess and adhered to the ring.

11. In a seal construction having a flexible web provided with an integral sealing lip and an integral extension adjacent the lip on the side thereof opposite the web, a relatively rigid thrust ring associated with the lip and underlying the extension, said lip being in the form of an inwardly extending V-shaped ridge and the inner diameter of the thrust ring being greater than that of the lip at the apex of the ridge, a backing ring overlying the extension, and means for preventing relative axial movement of the extension and backing ring and comprising a recess in the extension and material filling the recess and adhered to said backing ring.

12. In a seal construction having a flexible web provided with an integral sealing lip and an integral cylindrical portion adjacent the lip, a relatively rigid thrust member associated with the lip, said lip being in the form of a V-shaped ridge and the apex thereof extending beyond the thrust surface of the thrust member, means for attaching the thrust member to the extension and comprising a recess in the extension and thermo-setting bonding material filling the recess and being bonded to the surface thereof and the surface of the thrust member, a rigid member overlying the extension and the lip, and means comprising inter-engaging means carried by the member and the extension for preventing the member from becoming removed from the extension by a movement relatively toward the end of the extension.

NOEL S. REYNOLDS.